United States Patent [19]

Bailey

[11] Patent Number: 4,733,903
[45] Date of Patent: Mar. 29, 1988

[54] SWIVELLABLE SEAT FOR MOTOR VEHICLES

[76] Inventor: Roy M. Bailey, The Sportsmans Inn, Ivybridge, Nr. Plymouth, South Devon, PL21 OBQ, United Kingdom

[21] Appl. No.: 824,003
[22] PCT Filed: May 8, 1985
[86] PCT No.: PCT/GB85/00192
    § 371 Date: Jan. 7, 1986
    § 102(e) Date: Jan. 7, 1986
[87] PCT Pub. No.: WO85/05081
    PCT Pub. Date: Nov. 21, 1985

[30] Foreign Application Priority Data
    May 8, 1984 [GB] United Kingdom ............. 8411632

[51] Int. Cl.⁴ .................................... B60N 1/04
[52] U.S. Cl. ........................ 296/65 R; 297/349; 414/921
[58] Field of Search ............ 296/65 R; 414/921, 541; 297/349

[56] References Cited

U.S. PATENT DOCUMENTS

| | | | |
|---|---|---|---|
| 2,266,200 | 12/1941 | Hedley | 297/349 X |
| 2,864,431 | 12/1958 | Eaton | 296/65 R X |
| 3,191,400 | 6/1965 | Swenson | 297/349 X |
| 3,236,556 | 2/1966 | Lathers | 296/65 R |
| 3,593,954 | 7/1971 | Ritchie et al. | 297/349 |
| 4,133,437 | 1/1979 | Gates | 414/921 |
| 4,155,587 | 5/1979 | Mitchell | 296/65 R |
| 4,170,368 | 10/1979 | Southward et al. | 414/541 X |
| 4,306,634 | 12/1981 | Sangster | 414/921 X |

FOREIGN PATENT DOCUMENTS

| | | | |
|---|---|---|---|
| 2900514 | 7/1980 | Fed. Rep. of Germany | 297/349 |
| 2446198 | 9/1980 | France | 297/349 |
| 2456001 | 12/1980 | France | 414/921 |
| 2480206 | 10/1981 | France | 414/921 |
| 2507978 | 12/1982 | France | |
| 685010 | 12/1952 | United Kingdom | 297/349 |

Primary Examiner—Dennis H. Pedder
Attorney, Agent, or Firm—Cushman, Darby & Cushman

[57] ABSTRACT

A swivellable seat for a motor vehicle having a seat bearing on which a seat is mounted for rotation about a vertical swivel axis. The seat bearing is itself carried by a cantilevered support arm having a hinge attachment to a door pillar of the vehicle body such that the seat can be swung from a stowed position inboard of the vehicle to an outwardly projecting position outboard of the vehicle body, thereby facilitating access to the seat by disabled persons.

6 Claims, 4 Drawing Figures

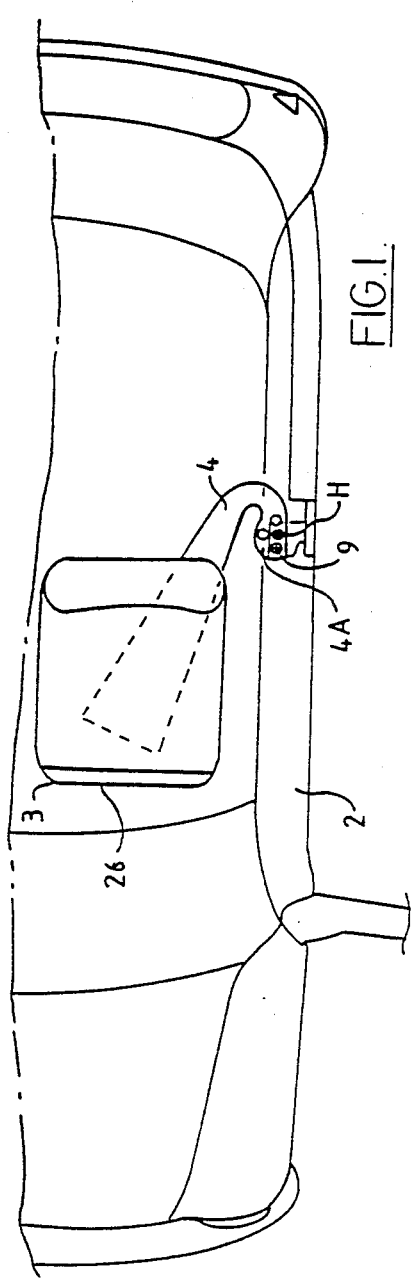
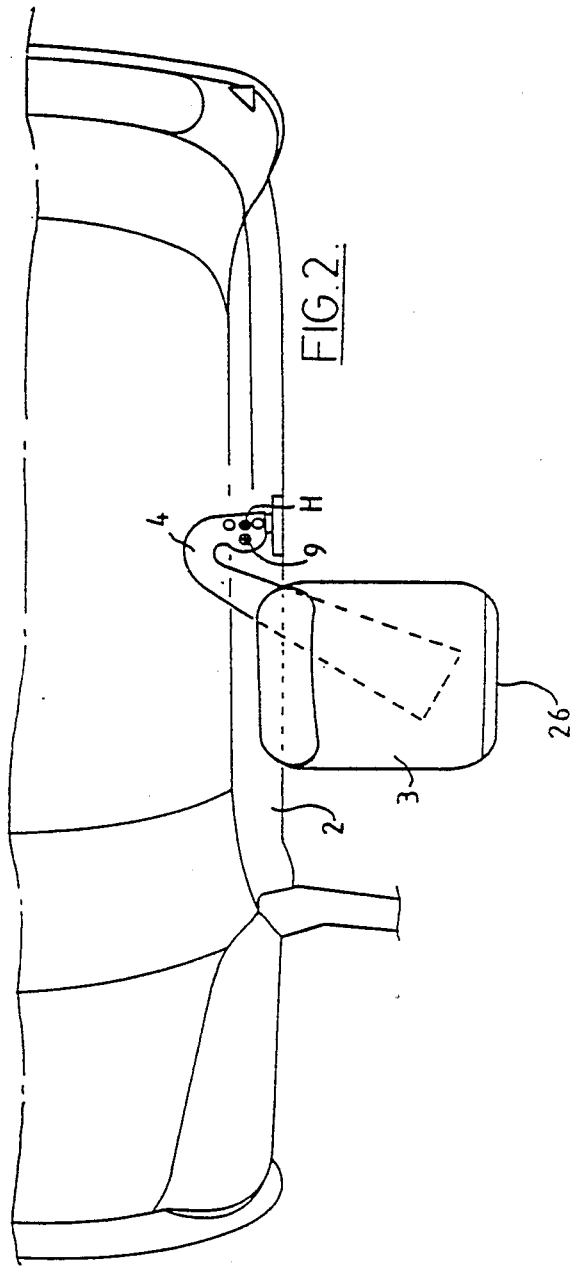

SWIVELLABLE SEAT FOR MOTOR VEHICLES

This invention relates to swivellable seats for motor vehicles.

A conventional motor car has forwardly facing seats with access provided through side doors. Entry into and exit from such vehicles can be difficult, even impossible, for elderly or disabled persons.

To enable a passenger to enter or leave a vehicle with greater ease it has been proposed to provide vehicles with swivellable front seats of the type comprising a seat bearing for supporting a seat for rotation about a vertical swivel axis. When a passenger enters or leaves the vehicle the front seat is swivelled so that it faces laterally outwardly. Once the passenger is seated the seat is swivelled into its forwardly facing position and locked.

Even where a vehicle is provide with a swivelling front seat of the type referred to, however, a disabled passenger can still have some difficulty in getting into the seat when it is in its laterally outwardly facing position, particularly where the headroom in the vehicle is restricted. The present invention seeks to overcome this difficulty by providing an improved swivellable seat for a motor vehicle.

According to the invention there is provided a swivellable seat for a motor vehicle of the type referred to, characterised in that the seat bearing is itself carried by a cantilevered support having a hinge for attachment to the vehicle body to enable the seat when mounted to be moved between a stowed position inboard of the vehicle and an outwardly projecting position in which the seat is outside the vehicle body.

A passenger can get into or out of the seat when it is supported in its outwardly projecting position outside the vehicle. The seat can be swivelled into any convenient position for access by the passenger. Once the passenger is seated the seat support is moved into its stowed position and the seat swivelled on the bearing into its forwardly facing position for normal use.

In a preferred embodiment of the invention the seat bearing is carried by a cantilever arm one end of which is provided with a hinge for connection to the vehicle body, permitting rotation of the cantilever arm about a hinge axis substantially parallel to and spaced from the swivel axis, so that the seat can be swung on the arm through a door opening of the vehicle.

In some passenger cars the floor of the passenger compartment is formed by a well in the underbody of the vehicle, so that the door openings in the body have deep sills. To enable the cantilever support arm of the swivellable seat of the present invention to swing over such a sill it may be desirable in practice to arrange the cantilever arm for pivotal movement about a horizontal axis, in addition to its swinging movement about the hinge axis, so that the arm can be lifted sufficiently to pass over the sill of the associated door opening. For example, the hinge may be connected to the vehicle body through a pivot connection having a pivot axis perpendicular to the hinge axis, actuator means being provided for rotating the hinge, and therefore the cantilever arm, about the said pivot axis so as to raise and lower the seat bearing selectively.

It addition, the cantilever arm may be cranked vertically to allow the seat to occupy a horizontal position of a floor well of the vehicle when the seat is lowered.

The swivellable seat according to the invention would normally be provided with releasable locking means for locking the seat in its inboard forwardly facing position, for normal use of the vehicle. Where the seat bearing is carried by a cantilever arm the locking means for the seat may include interengagable locking elements provided on the floor of the vehicle and on the seat, these elements interengaging when the arm has been swung inwardly into its stowed position.

The seat bearing employed in the present invention may take a number of different forms. In a preferred embodiment the seat bearing comprises a bearing plate or ring carried by the support and concentric with the swivel axis, and a swivel plate attachable to the seat and resting upon the bearing plate or ring for rotation about the swivel axis.

The invention will be further described, by way of example only, with reference to the accompanying purely diagrammatic drawings, in which:

FIG. 1 is a plan view of a motor vehicle provided with a swivellable seat according to one embodiment of the invention, shown in its stowed first position for normal use;

FIG. 2 is a plan view similar to FIG. 1, showing the seat in a laterally outwardly projecting second position;

Figure 3:
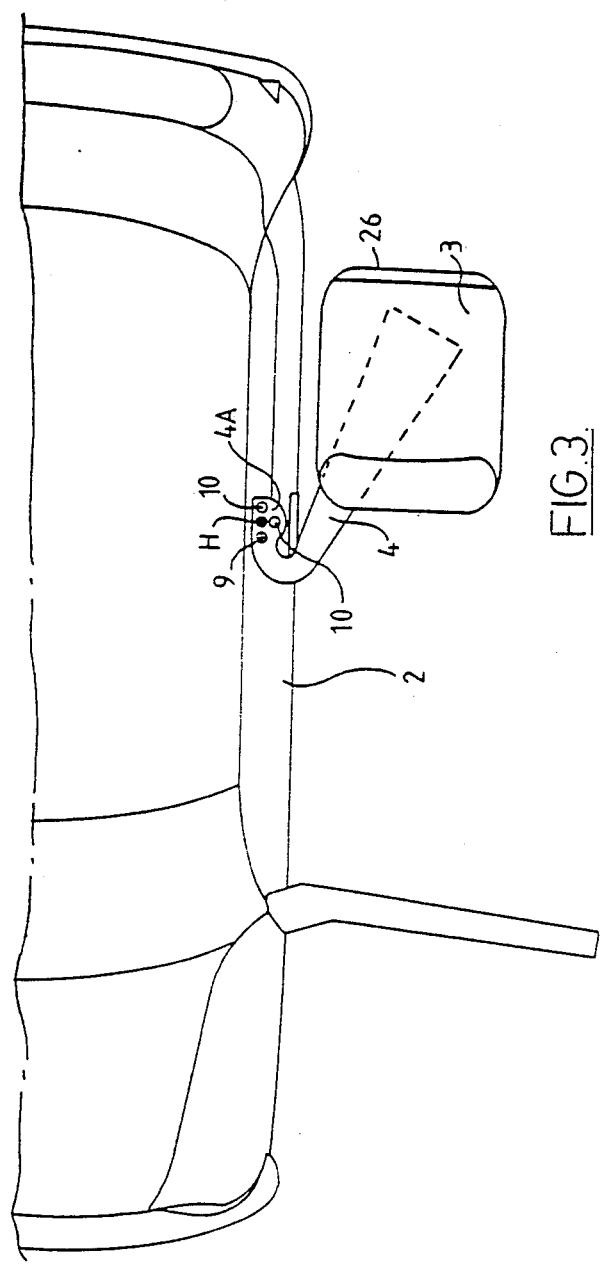
FIG. 3 is a plan view similar to FIG. 1 showing the seat in its laterally outwardly projecting third position, facing rearwardly.

Referring first to FIG. 1, a vehicle body 1 has a front door opening 2 and a front passenger seat 3 which is swivel-mounted in accordance with the invention.

The seat 3 is supported for rotation about a vertical swivel axis S at one end of a centilever support arm 4. The other end of the arm 4 is connected to the vehicle body 1 through a hinge the axis H of which is parallel to and spaced from the swivel axis S.

The hinge axis H of the cantilever arm 4 is located close a door pillar 5 at the rear of the door opening 2, the positioning of the hinge axis H, and the shape of the cantilever arm 4, being such that the entire seat 3 can be swung outwardly through the door opening 2 from the forwardly facing inboard or stowed first position of normal use, shown in FIG. 1, to an outboard second position shown in FIG. 2, in which the seat 3 is located wholly outside the vehicle body.

The seat 3 is lockable against swivel movement about the swivel axis S but can be released for swivelling both in its stowed position within the vehicle body 1 and in its laterally outwardly diposed position outside the vehicle body 1. In particular, when the seat 3 is outside the vehicle body 1 it may be swivelled about its axis S between a laterally outwardly-facing position, shown in FIG. 2, which is the orientation of the seat 3 after it has been swung through the door opening 2 on the arm 4, and a rearwardly-facing position, shown in FIG. 3.

Access to the seat 3, for example by a disabled passenger, is easily possible with the seat 3 in its outwardly-facing position of FIG. 2 or its rearwardly-facing position of FIG. 3. The seat 3 may be locked against swivelling movement about the axis S in both of these positions.

With the seat 3 disposed entirely outside the vehicle body and facing rearwardly (FIG. 3) it is a relatively easy matter for a person to sit on the seat. Moreover, if the person is disabled, it is much easier for a helper to assist the person into the seat 3 than would be the case if the seat were inside the vehicle, whether facing forwardly or laterally outwardly.

Figure 4:
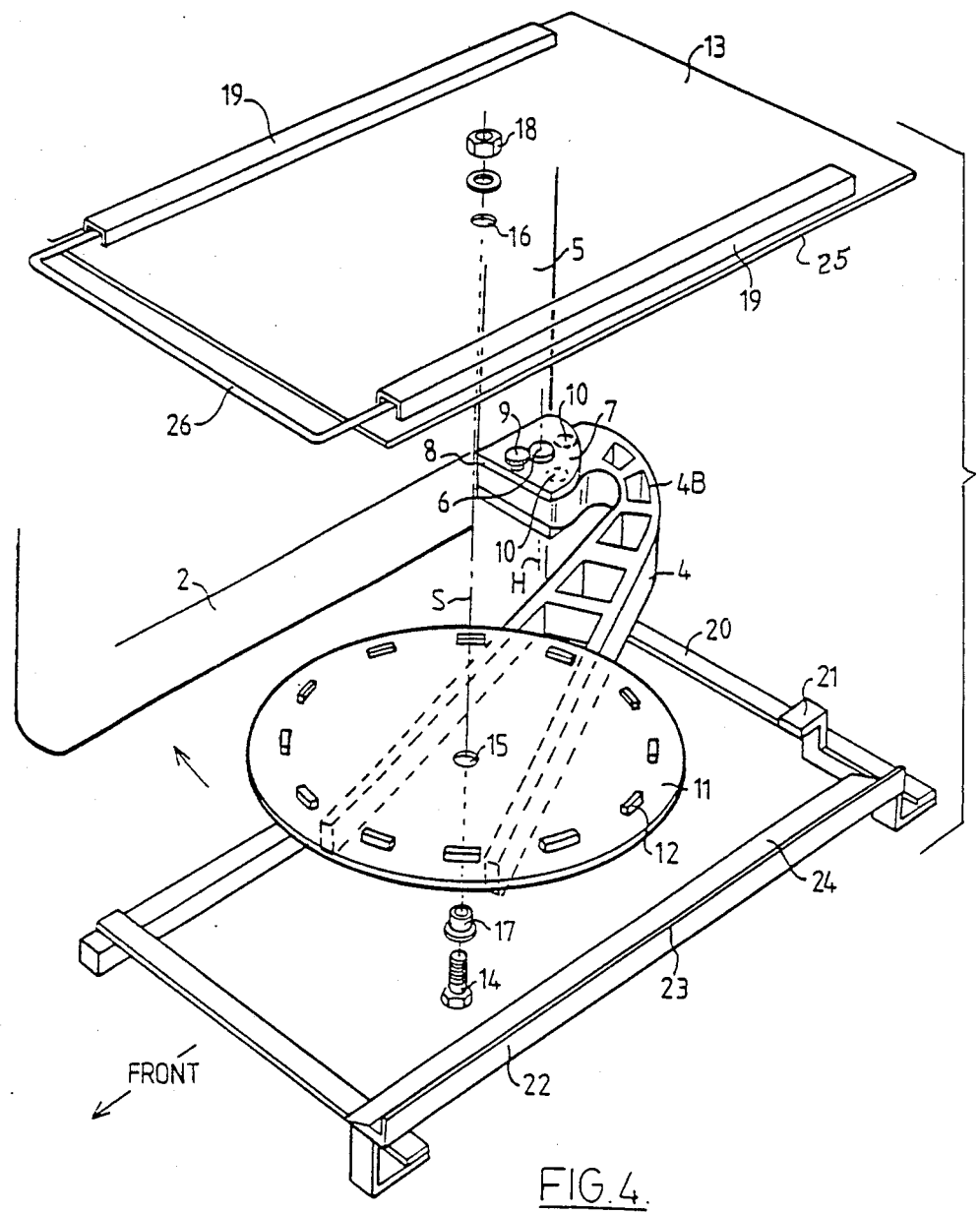
FIG. 4 is an exploded perspective view of the support for the swivellable seat of the type shown in FIGS. 1 to 3, according to the present invention mounted to the left side of the vehicle.

FIG. 4 shows one example of the mounting arrangement for the seat 3, the seat itself being omitted for ease of illustration.

The cantilever arm 4 is cast in metal, for example aluminium or aluminium alloy, and has a hinge 6 defining the hinge axis H at one end of the arm 4. The hinge 6 has a vertical hinge-pin which is rotatably supported in brackets 7 projecting horizontally from a vertical mounting plate 8 affixed to the door pillar 5 on the inside of the vehicle body. The upper bracket 7 carries a spring-loaded locking pin 9 which can engage selectively in holes 10 provided in the cantilever arm 4 near the hinge axis H to define specific locked positions in which the arm 4 can be locked angularly relative to the vehicle body 1.

In the example illustrated three locked positions of the arm are defined by respective holes 10, namely an inboard forwardly-facing stowed first position, shown in FIG. 1, an outboard second position, shown in FIG. 2, in which the seat 3 is outboard of the door opening 2, and an outboard third position, shown in FIG. 3, in which the arm 4 has been swung further outwardly from the second position shown in FIG. 2 to a position in which the seat 3 has been displaced rearwardly relative to the door opening 2.

Release of the locking pin 9 can be effected under remote control by solenoid-operation or by a Bowden Cable connecting the pin 9 to an operating handle or lever (not shown).

In an alternative locking arrangement for the cantilever arm 4 a locking pin may be engageable in a hole in the arm 4 and in a selected one of a number of holes in one of the fixed hinge brackets 7 of the hinge.

In the illustrated example the locked positions of the arm 4 are such that the arm 4 can be swung through an arc of substantially 180° between its first position and its third position, as can be seen by a comparison of FIGS. 1 and 3. This wide arc of movement is permitted by the shape of the cantilever arm 4, which has a root portion 4A adjoining its hinge axis H such that, when the arm 4 is in its first position (FIG. 1) the root portion 4A extends forwardly from the hinge axis H while when the arm 4 is in its third position (FIG. 3) the root portion 4A extends rearwardly from the hinge axis H. The root portion 4A is joined to the remainder of the support arm 4 by a curved portion 4B which 'wraps around' the door pillar 5 when the arm 4 is disposed in its third position, permitting the remainder of the arm 4 to project outwardly and rearwardly from the door opening 2. This arrangement also affords a compact stowed position for the arm 4 when the seat is in its inboard position (FIG. 1).

The seat 3 is supported by a circular bearing plate 11 (FIG. 4) affixed to the free end of the cantilever arm 4, which in this example is bifurcated to give distributed support to the plate 11. The bearing plate 11 carries on its upper surface a number of bearing blocks 12 arranged circumferentially on a circle concentric with the centre of the plate 11, which defines the swivel axis S. As can be seen in FIG. 4, swivel axis S is parallel to the hinge axis H.

A swivel plate 13 attachable to the underside of the seat rests upon the bearing plate 11 through the bearing blocks 12 and is pivotally connected to the plate 11 by a pivot pin 14 passing through central aligned holes 15, 16 in the bearing plate 11 and the swivel plate 13 respectively. The pivot pin 14 engages in a bearing bush 17 which is located in the holes 15, 16 and is anchored by a nut 18.

Where the invention is adapted to an existing vehicle seat the swivel plate 13 may be conveniently be attached to a pair of channel section guides 19 on the underside of the vehicle seat.

A base frame 20 is mounted on the floor of the vehicle passenger compartment on which the channel section guides 19 would normally be mounted. The base frame 20 is provided with a backstop 21 and with an inboard longitudinal member 22 which is raised relative to the remainder of the frame 20. The longitudinal member 22 has an upstanding stop edge or flange 23 on its inboard edge and has a bevelled ramp surface 24 on its opposite edge, facing towards the door opening.

When the seat is moved into its forwardly-facing stowed first position within the vehicle the swivel plate 13 is located over the base frame 20 and the inboard longitudinal edge 25 of the swivel plate 13 rides over the ramp surface 24 and abuts the stop flange 23. Once the arm 4 has been locked by engagement of the locking pin 9 in the appropriate hole 10 the abutment of the edge 25 and the stop flange 23 prevents angular movement of the swivel plate 13, and therefore of the seat 3, about the swivel axis S.

In an alternative arrangement (not shown) the base frame 20, for example, the longitudinal member 22, may be provided with a spring-loaded locking element (not shown) engageable in a hole or detent in the swivel plate 13 to lock the latter relative to the bearing plate 11. The locking element may be released by means of a manual lever (not shown) acting against a biassing spring, in a conventional manner.

Where the vehicle has a floor well such that the lower edge of the door opening to is bound by a deep sill, provision may be made for lifting the seat 3 within the vehicle body sufficiently to enable the seat and its supporting cantilever arm 4 to clear the sill of the door opening when it is swung outwardly. For example, the hinge 6 of the cantilever arm 4 may be attached to the vehicle body through a pivot connection (not shown) having a horizontal axis which is perpendicular to the hinge axis so that the hinge 6 can be rotated about the horizontal axis in order to lift the cantilever arm 4. Such rotation may be effected by an hydraulic actuator (not shown) supported on the mounting plate and operable by a small hand pump.

The seat 3 carried on thw swivel plate 13 may be provided with a forwardly-projecting footrest 26 for supporting the feet of the seat occupant as the seat 3 is swung on the cantilever arm 4 or swivelled about the axis S.

The movable parts of the seat as described, including the swivel plate 13 and the cantilever support arm 4, may in practice by power-operated, for example by electrical servomotors, or power-assisted.

The size and shape of the cantilever amr 4 and the position of its hinge axis H may be chosen to fit the size of the vehicle door opening 2 and the depth of the floor of the passenger compartment, although in practice it is envisaged that a standard assembly with a shallow seat 3 mounted on the swivel plate 13 will be suitable for installation in a variety of makes of vehicle.

I claim:

1. A swivellable seat for a motor vehicle comprising:

a seat bearing for supporting a seat for rotation about a swivel axis, said seat bearing including a bearing plate concentric with the swivel axis and a swivel plate attachable to the seat and resting upon said bearing plate for rotation relative thereto about said swivel axis, a cantilevered support arm mounted at one end thereof to said bearing plate of said seat bearing and including a hinge at the other end thereof for mounting to a door pillar of the vehicle body so that said cantilevered support arm is pivotal about a hinge axis substantially parallel to and spaced from said swivel axis and is movable angularly about the hinge axis between a first position in which said seat bearing is inboard, corresponding to a stowed positon of the seat, and a second position in which said seat bearing is outboard of a door opening of the vehicle, and a third position in which the seat bearing is outboard of the vehicle and displaced rearwardly relative to the door opening.

2. A swivellable seat according to claim 1, wherein said cantilevered support arm is lockable in each said position.

3. A swivellable seat according to claim 2, wherein at least one of the seat and said seat bearing includes abutment means for engagement with an upstanding stop on the floor of the vehicle body to prevent angular movement of the seat about the swivel axis when the seat is in its stowed position inboard of the vehicle.

4. A swivellable seat according to claim 1, wherein at least one of the seat and said seat bearing include abutment means for engagement with an upstandanding stop on the floor of the vehicle body to prevent angular movement of the seat about the swivel axis when the seat is in its stowed position inboard of the vehicle.

5. A swivellable seat according to anyone of claims 1, 4, 2 and 3, wherein said swivel plate rests upon said bearing plate through a plurality of circumferentially spaced apart bearing blocks arranged in a ring concentric with said swivel axis.

6. A swivellable seat according to claim 1, wherein said cantilevered support arm is angularly movable through substantially 180° between said first and third positions.

* * * * *